United States Patent [19]
McIver et al.

[11] Patent Number: 4,547,862
[45] Date of Patent: Oct. 15, 1985

[54] MONOLITHIC FAST FOURIER TRANSFORM CIRCUIT

[75] Inventors: George W. McIver, Redondo Beach; Barry H. Whalen, Rancho Palos Verdes; Bruce L. Troutman, Irvine, all of Calif.

[73] Assignee: TRW Inc., Redondo Beach, Calif.

[21] Appl. No.: 338,733

[22] Filed: Jan. 11, 1982

[51] Int. Cl.[4] .......................................... G06F 15/332
[52] U.S. Cl. ...................................... 364/726; 364/757
[58] Field of Search .............. 364/576, 725, 726, 826, 364/827, 757

[56] References Cited

U.S. PATENT DOCUMENTS 4,229,800 10/1980 Gregorian et al. .................. 364/757
4,241,411 12/1980 Krasner et al. ....................... 364/726
4,407,018 9/1983 Kanemasa ............................ 364/726

FOREIGN PATENT DOCUMENTS 2006485 5/1979 United Kingdom ................ 364/576

OTHER PUBLICATIONS

Karwoski, "Fast Multiplier-Accumulators Implement FFT Butterflies", Electronic Design, vol. 29, No. 4, Feb. 19, 1981, pp. 141-146.

*Primary Examiner*—Joseph Ruggiero
*Attorney, Agent, or Firm*—Noel F. Heal; Robert M. Wallace; Robert W. Keller

[57] ABSTRACT

A fast Fourier transform circuit formed on a single chip, including a fast multiplier-accumulator circuit which, in the preferred embodiment, employs a modified form of Booth's algorithm, an adder circuit, a read-only memory for storing FFT twiddle factors, and a random access memory for holding a set of input complex quantities and for receiving intermediate and final results in an in-place FFT operation. In the preferred embodiment, the FFT twiddle factors are stored in Booth's code for greater speed of operation. Control and timing circuitry on the same chip generates control signals and address codes in order to perform a sequence of butterfly computations by repeated use of the multiplier-accumulator and adder circuits, to generate FFT coefficients in the random access memory.

19 Claims, 4 Drawing Figures

MONOLITHIC FAST FOURIER TRANSFORM CIRCUIT

BACKGROUND OF THE INVENTION

This invention relates generally to digital signal processing circuits, and, more particularly, to circuitry for performing a fast Fourier transform (FFT) function on a set of data input signals. Fourier transformation is a mathematical algorithm for deriving a frequency spectrum of a time-varying quantity, usually in the form of an electrical signal. Fourier transforms are useful in a wide variety of applications involving spectrum analysis.

Some preliminary definitions will serve to provide a basis for further discussion of Fourier transforms. First, a graph plotting the variation of a signal value with respect to time is referred to as a representation of the signal in the time domain. A corresponding plot of the spectral content of the signal, showing signal amplitudes for a range of frequencies, is referred to as a representation of the signal in the frequency domain. The Fourier transform is a mathematical formula for converting a signal from a time-domain representation to a frequency-domain representation. The inverse Fourier transform is a formula for converting a signal from a frequency-domain representation to a time-domain representation. The discrete Fourier transform (DFT) may be viewed as a special case of the continuous form of the Fourier transform. The DFT determines a set of spectrum amplitudes or coefficients from a time-varying signal defined by a periodic sequence of samples taken at discrete time intervals.

As is well known, in the mid-1960's techniques were developed for more rapid computation of the discrete Fourier transform. These techniques became known as the fast Fourier transform (FFT), first described in a paper by J. W. Cooley and J. W. Tukey, entitled "An Algorithm for the Machine Calculation of Complex Fourier Series," Mathematics of Computation (1965), Vol. 19, No. 90, pp. 297–301.

Since the development of the fast Fourier transform, many different designs have been proposed for hardware implementation of the discrete Fourier transform. U.S. Pat. No. 4,156,920, issued in the name of Winograd and entitled "Computer System Architecture for Performing Nested Loop Operations to Effect a Discrete Fourier Transform," lists a number of patents in the field. The Winograd patent and the patents listed therein at Column 4 were believed to the exemplary of the prior art. Basically, prior inventions in this area have focused on a variety of special architectures for simplifying or improving the efficiency of calculations of the Fourier transform. Prior to this invention, however, such specially designed FFT hardware has been relatively bulky and inefficient, with respect to both speed and power consumption. Furthermore, the organization of such hardware has in the past involved the use of a few fast computation elements sharing a common memory. In such systems, computation rates are typically limited by memory access time and are relatively slow.

Since the development of microprocessors, an increasingly common technique for computing the fast Fourier transform is to employ a microprocessor programmed to perform the function. Again, however, because of the generalized nature of microprocessor architecture, the relatively slow speed of computation is a significant limiting factor for many applications. Another problem with prior-art FFT hardware, whether of special-purpose design or based on a microprocessor implementation, is that these designs are not easily expandable to handle large FFT computations at high speed and without bulky circuitry.

In view of the foregoing, it will be apparent that there has until now been a significant need for improvement in fast Fourier transform circuits. In particular, there has been a special need for a fast Fourier transform circuit having low power consumption, small size, very high speed, and the ability to be expanded to accommodate relatively large FFT computations. The present invention fulfills this need.

SUMMARY OF THE INVENTION

The present invention resides in a completely self-contained and monolithic fast Fourier transform circuit, including a combination of read-only memory (ROM), random access memory (RAM), computational elements, and control circuits, all fabricated on a single monolithic chip.

Briefly, and in general terms, the monolithic circuit of the invention includes a fast multiplier circuit, a read-only memory for storage of FFT twiddle factors, and a two-port random access memory for storage of input data, intermediate results and output data. Also included are first and second adder circuits to combine products from the multiplier circuit with input and intermediate data from the random access memory, and a register stack to provide temporary storage for data being transferred between the random access memory and either the multiplier circuit or the adder circuit. A data input register is connectable to the write bus of the random access memory and a data output register is connectable to the read bus of the memory. Finally, a control and timing circuit is utilized to generate signals to control the transfer of data between the circuit elements, and to control operation of the multiplier circuit, the random access memory, the adder circuits and the register stack. The circuit of the invention thereby performs computation of a set of FFT coefficients from a set of input signals applied to the data input register and stored in the random access memory.

In a presently preferred embodiment of the invention, the multiplier circuit and the first adder circuit are combined into a single multiplier-accumulator for greater speed of operation. Product sums from the multiplier-accumulator are combined with data from the random access memory in the second adder circuit.

The multiplier-accumulator circuit and the second adder circuit are used repeatedly to perform a large number of computations referred to as "butterfly" computations, in order to compute the FFT by a method known as decimation in time. The invention could also have been implemented in a form that utilized instead an alternative method known as decimation in frequency. Each butterfly computation involves repeated use of the multiplier-accumulator and second adder circuits to evaluate expressions of the type $A+WB$ and $A-WB$, where A, B and W are complex quantities, and the W values are FFT "twiddle factors" stored in the read-only memory. Twiddle factors are unit-length phasors that effect rotation of the complex quantities B by which they are multiplied.

The control and timing circuit includes a precoded logic array, a control counter, and an instruction decoder. Basically, the precoded logic array generates control signals on a plurality of output control lines, in accordance with the values provided by the control counter and the instruction decoder. The value in the control counter is advanced by externally supplied clocking signals and provides a timing function for the circuit. The control signals from the precoded logic array are connected to the multiplier-accumulator circuit, to the data input and output registers, to the register stack, to the second adder circuit, and to an output register coupled to the read-only memory. In addition, the precoded logic array generates coded addresses for selection of storage locations in the read-only memory and in the random access memory.

The instruction decoder receives coded instruction words indicating which of the monolithic circuit's functions are to be performed, such as loading data, unloading data, performing the FFT, and so forth. Also in the control and timing circuit is a comparator, for comparing an externally supplied chip selection code with a preselected chip identification code for the particular circuit. If a match is obtained in the comparator, a strobe signal is provided to the instruction decoder to initiate execution of an instruction. One of the coded instructions that can be supplied to the circuit is a status instruction, to provide a five-bit status word to a status register coupled to the precoded logic array.

An important aspect of the invention is that external connections to the circuit can be made through a convenient common busing structure. Thus, a plurality of the FFT circuits can be connected to the bus structure, which includes data input lines, data output lines, status register lines, instruction code word lines, and chip selection lines, together with all necessary clocking and power-supply lines. The key to operation of this commonly bused system of FFT circuits lies in use of the chip selection signals. Since each FFT circuit can have a unique chip identifier, the circuits can be uniquely addressed as desired by using the chip selection lines. The busing arrangement permits a systematic organization of circuits for performing larger FFT functions than could be accomodated on a single chip. For example, the basic FFT circuit to be described in detail for purposes of illustration performs a 32-point fast Fourier transform. Also disclosed by way of example is a configuration employing sixteen 32-point FFT chips, for performing a 1024-point FFT. The modularity of the FFT circuit and its ability to operate asynchronously with respect to other FFT circuit modules, permit the design of a variety of configurations for larger FFT computations.

The register stack serves as a pipeline or buffer between the multiplier-accumulator and adder circuits and the random access memory. In the illustrative embodiment of the invention, the register stack includes four separate registers, designated an A register, a B-real register, a B-imaginary register and an R register. As already noted, the circuit follows the principles of decimation in time to perform the FFT, and the multiplier-accumulator and adder circuits perform butterfly computations of the type $A+BW$ and $A-BW$. Since A, B and W are all, in general, complex quantities, the butterfly computation may necessitate four multiplies and six additions or subtractions. The B-real and B-imaginary registers are used to hold the real and imaginary components of the complex quantity B, and the A register is used to hold either the real or the imaginary component of the quantity A, depending on the phase of the operation being performed.

The B registers supply multiplier values to the multiplier-accumulator circuit, the multiplicands being retrieved from the read-only memory, and the products being appropriately accumulated in the first adder circuit, i.e., in the accumulator portion of the multiplier-accumulator circuit. Two product additions, needed to perform the complex multiplication WB are performed in the multiplier-accumulator circuit, the results being fed to the second adder circuit. The other inputs to the second adder circuit are supplied from the A register, and the results of the addition or subtraction operation are transmitted to the R or result register, and thence back to the random access memory. Use of two registers for the B quantity eliminates competition for the memory read bus which would otherwise occur.

It will be appreciated from the foregoing that the present invention represents a significant advance in the field of fast Fourier transform hardware. In particular, the combination of computational elements, memory, and control circuitry on a single chip results in a highly efficient FFT circuit having low power consumption and very high speed. The speed and throughput of the circuit are attributable to a combination of structural elements, including the use of a Booth's algorithm multiplier, the storage of FFT twiddle factors in Booth's code rather than in binary code, and the use of the register stack to interface between the random access memory and the computational elements. Finally, the combination of a convenient busing arrangement and chip selection circuitry allows the circuit of the invention to be combined with others of the same type for the performance of FFT operations of a larger scale. Other aspects and advantages of the invention will become apparent from the following more detailed description, taken in conjunction with the accompanying drawings.

DESCRIPTION OF THE PREFERRED EMBODIMENT

As shown in the drawings for purposes of illustration, the present invention is concerned with hardware for the computation of fast Fourier transforms (FFTs). The mathematics of Fourier transforms has been amply discussed in the technical literature. The present invention is not concerned with any novelty in a mathematical algorithm, but rather with a novel hardware implementation of a well known mathematical algorithm for performing the FFT function. Necessary equations will be stated, but not developed here. A further explanation of the mathematics of the FFT may be found in a text entitled "Theory and Application of Digital Signal Processing" by Lawrence R. Rabiner and Bernard Gold, Prentice-Hall, Inc. (1975).

The discrete Fourier transform (DFT) of a finite duration sequence x(n), where n varies from 0 to N−1, is defined as:

$$X(k) = \sum_{n=0}^{N-1} x(n)e^{-j(2\pi/N)nk} \quad (1)$$

where

X(k) are the frequency coefficients of the an N-point FFT and x(n) are the time samples of a periodic function in the time domain.

This expression is usually simplified to:

$$X(k) = \sum_{n=0}^{N-1} x(n) W^{nk}, \quad (2)$$

where $W = e^{-j(2\pi/N)}$

In performing a fast Fourier transform of the type known as a radix-two decimation-in-time FFT, the size of the transform is successively halved at each stage. In the illustrative circuit to be described here, a 32-point FFT is split into a pair of 16-point FFT's, which are in turn split into four 8-point FFT's, then eight 4-point FFT's, and finally sixteen 2-point FFT's. This is well explained in various texts on the FFT; for example in chapter 6 of the Rabiner and Gold text referred to above. The resulting computation for a 32-point FFT is shown in the signal flow graph of FIG. 2. The quantities on the left-hand side of the signal flow graph, ranging from x(0) to x(31) are the sampled inputs to the FFT, while the signals appearing at the right-hand side of the signal flow graph and numbered 0 through 31 are the resulting FFT coefficients. The signal flow graph shows that there are five passes or phases of operation of the circuit, derived from the relationship that the number 32 is two to the fifth power.

Figures 2, 2A:
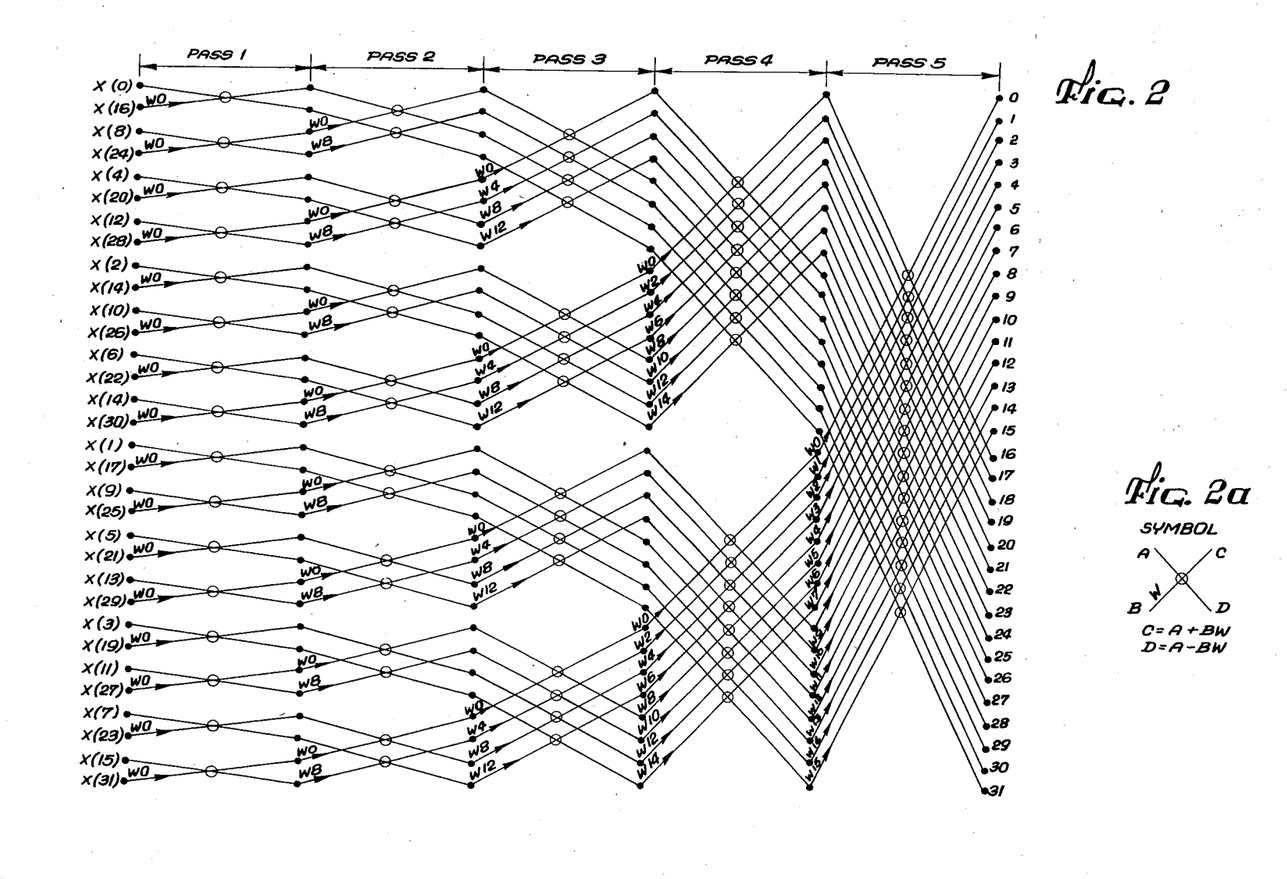
FIG. 2 is a signal flow graph illustrating the computations that are made by the circuit in the performance of a 32-point FFT in accordance with the decimation-in-time method.
FIG. 2a is a legend showing the significance of a single butterfly computation module of FIG. 2.

The convention used in the signal flow graph is that an arrowhead represents multiplication by the complex quantity $W^k$ adjacent to the arrowhead. The small circles represent addition or subtraction as indicated in FIG. 2a. If the input to each of the butterfly computational modules shown in FIG. 2a is indicated by signal names A and B, and the outputs are indicated by signal names C and D, then the computations performed in the butterfly module are:

$$C = A + BW$$

$$D = A - BW$$

The W values are usually referred to as "twiddle factors" and, as will be apparent from the expression for W following equation (2) above, the twiddle factors represent phasors of unit length and an angular orientation which is an integral multiple of $2\pi/32$. It will also be apparent that, although there are thirty-two possible values for $W^k$, only sixteen need be stored, since the other sixteen merely have opposite signs.

Another interesting and well known aspect of FFT computation by decimation in time is that the results of each butterfly computation may be stored back in memory in the same locations from which the inputs to the butterfly were obtained. More specifically, the C and D outputs of each butterfly may be stored back in the same locations as the A and B inputs of the same butterfly.

The FFT computation is referred to as an "in-place" algorithm for this reason.

As is apparent from FIG. 2, the inputs to the FFT circuit have to be stored in a shuffled order if the output coefficients are to be provided in a natural order, i.e., 0–31. As discussed in the Rabiner and Gold text, at page 364, there is a simple algorithm for computing the shuffled order. Basically, it involves reversing the bit sequence of a binary representation of the natural-order index of each item, and then computing a shuffled-order index from the bit-reversed binary representation.

Various techniques have been suggested for implementing a fast Fourier transform of the foregoing general type, but prior to this invention all have suffered from the disadvantages of bulkiness, high power consumption, and relatively slow speed. In accordance with a principal aspect of this invention, a fast Fourier transform is implemented on a single chip, including memory, computational elements and control circuitry, with a resulting significant improvement in speed and power consumption.

Figure 1:
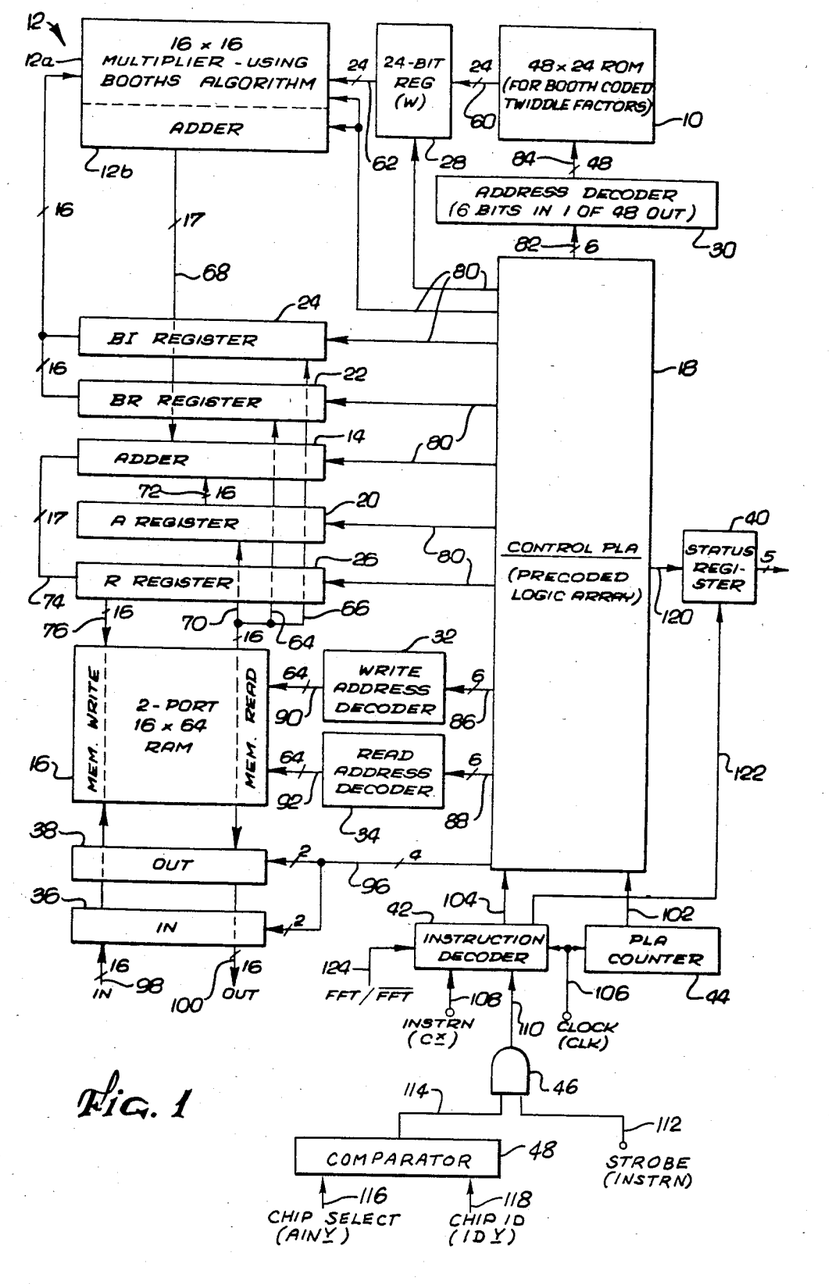
FIG. 1 is a block diagram of a monolithic 32-point FFT circuit embodying the principles of the present invention.

As shown in the block diagram of FIG. 1, the circuit of the invention includes a 24×48 read-only memory (ROM), indicated by reference numeral 10, a 16×16 multiplier-accumulator circuit 12, a 17-bit adder circuit 14, a two-port random access memory (RAM) 16, and a precoded logic array 18 used to control operation of the computation and memory elements. Also included is a register stack having four 16-bit registers, namely an A register 20, a BI register 24, a BR register 22, and an R register 26, which together serve to provide intermediate storage for data transferred to and from the multiplier-accumulator circuit 12 and the adder circuit 14. A 24-bit W register 28 serves as intermediate storage between the read-only memory 10 and the multiplier-accumulator circuit 12. The FFT circuit also includes a read-only memory address decoder 30, a RAM write address decoder 32 and a RAM read address decoder 34. Coupled to the random access memory 16 are a data input register 36 and a data output register 38. Completing the circuitry shown in FIG. 1 are a status register 40, an instruction decoder 42, a precoded logic array counter 44, an AND gate 46 and an address comparator 48, all of which will be further discussed below.

The multiplier-accumulator circuit 12, as shown in FIG. 1, may be considered as comprising a multiplier circuit 12a and an adder circuit 12b for combining the multiplier products obtained from the complex multiplication WB. To maximize speed, however, the circuits 12a and 12b are combined into the multiplier-accumulator circuit 12 in the presently preferred embodiment of the invention.

Basically, the circuit shown in FIG. 1 performs an FFT function on 32 complex variables stored in the random access memory 16. The FFT is computed in accordance with the signal flow graph shown in FIG. 2, using the multiplier-accumulator circuit 12 and the adder circuit 14 as the basic computational elements for each butterfly computation. The $W^k$ factors are stored in the read-only memory 10, transferred over lines 60 to the W register 28, and thence over lines 62 to the multiplier-accumulator circuit 12. For each butterfly computation, real and imaginary portions of a B quantity are retrieved from the random access memory 16 through the read bus, and are transferred to the BR register 22 and the BI register 24, respectively, over lines 64 and 66. As each complex multiplication operation is completed in the multiplier-accumulator 12, two product sums, representing the real and imaginary components of the complex product, are transmitted to the adder circuit 14 over lines 68 from the multiplier-accumulator circuit.

The A register 20 receives real and imaginary data from the random access memory 16 over lines 70, and these data are also input to the adder, over lines 72. The result of each addition or subtraction in the adder 14 is transferred over lines 74 to the R register 26, and from there over lines 76 back to the write bus of the random access memory 16. Operations of data transfer, multiplication, and addition are directed by signals on control lines, indicated by reference numeral 80, extending from the precoded logic array 18 to the W register 28, the multiplier-accumulator circuit 12, the adder circuit 14, and the register stack 20, 22, 24, and 26.

Six-bit address codes are transmitted over lines 82 to the ROM address decoder 30, which selects one of forty-eight word address lines 84 to the read-only memory 10. Similarly, six-bit address codes on lines 86 and 88 are transmitted to the write address decoder 32 and the read address decoder 34, respectively. Address selection lines 80 and 92 from the decoders 32 and 34 make appropriate address selections in the random access memory 16. Another set of control lines 96 extends from the precoded logic array 18 to the data input register 36 and the data output register 38, to control data input to the random access memory over lines 98, and data output from the random access memory over lines 100.

The precoded logic array 18 generates appropriate addressing and control signals on lines 80, 82, 86, 88 and 96, in response to the codes provided by the precoded logic array (PLA) counter 44 over lines 102, and codes provided over lines 104 from the instruction decoder 42. Clock signals are provided to the counter 44 and the instruction decoder 42, as indicated at 106. One of a plurality of coded instructions is transmitted over lines 108 to the instruction decoder 42. However, the instruction is not executed until an appropriate strobe signal is received on line 110, which is also connected as an input to the instruction decoder 42. The strobe signal on line 110 is derived from the output of AND gate 46, which has as inputs a strobe instruction signal on line 112 and an enabling signal on line 114 from the comparator 48. The comparator 48 receives chip selection signals on lines 116 and chip identifier signals on lines 118. The chip identifier signals on lines 118 are either permanently coded into the chip or may be set by means of rocker switches or the like (not shown). The chip identifier is typically selected to be unique to each circuit employed in a larger configuration of such circuits. Thus, the comparator 48 produces an enabling output on line 114 only when the chip selection signals on line 116 match exactly the chip identifier signals on line 118. The output from the comparator 48 then enables the strobe instruction by means of AND gate 46, and produces the required strobe signal on line 110 to the instruction decoder 42.

The PLA counter 44 is clock-driven and is primarily responsible for sequencing operations of the circuit, through the precoded logic array 18. The precoded logic array 18 is a generalized array of logic elements arranged in matrix form. The array 18 has as inputs the codes provided over lines 102 and 104 from the precoded logic array counter 44 and the instruction decoder 42, and provides as outputs the coded addresses on lines 82, 86 and 88 and appropriately timed control signals on lines 80 and 86. In addition, the precoded logic array 18 provides status outputs over lines 120 to the status register 40 which is controlled by a line 122 from the instruction decoder 42.

An additional control line 124 connected to the instruction decoder 42 is used to select either normal or inverse FFT operation. As discussed further below, the read-only memory 10 is preferably large enough to contain twiddle factors for the inverse transformation as well as the normal or forward transformation.

The multiplier circuit 12 operates in accordance with a modified form of a fast multiplication method known as Booth's algorithm. The algorithm used is described in a paper entitled "A Proof of the Modified Booth's Algorithm for Multiplication" by Lewis P. Rubenfield, published in the IEEE Transactions on Computers, October, 1975, pp. 1014-1015. In accordance with this algorithm, the bits of a binary multiplier quantity are scanned from least significant to most significant, and are examined in sets of three to determine how a multiplicand quantity is to be manipulated to form the product. In order to understand the significance and advantage of storing the FFT twiddle factors in Booth's code form, it is necessary to briefly explore the mathematics of the modified Booth's algorithm employed in the multiplier circuit 12a. A more complete explanation can be found in the cited article by Rubenfield.

First, it is assumed that a multiplier Y is an N-bit fractional quantity in two's complement form, and that $y_i$ is the ith bit of the multiplier, with $y_0$ the sign bit and $y_{N-1}$ the least significant bit. Thus, a sixteen-bit multiplier quantity Y will take the following form:

$$Y = -y_0 + y_1 2^{-1} + y_2 2^{-2} + \ldots + y_{13} 2^{-13} + y_{14} 2^{-14} + y_{15} 2^{-15},$$

where $y_0$ through $y_{15}$ have values 0 or 1.

In accordance with the modified Booth's algorithm, the multiplier bits are considered in the following groups of three:

$$y_{14}\ y_{15}\ 0$$
$$y_{12}\ y_{13}\ y_{14}$$
$$y_{10}\ y_{11}\ y_{12}$$
$$\cdot\ \ \cdot\ \ \cdot$$
$$\cdot\ \ \cdot\ \ \cdot$$
$$\cdot\ \ \cdot\ \ \cdot$$
$$y_2\ y_3\ y_4$$
$$y_0\ y_1\ y_2$$

For each set of three bits, $y_{i-1}$, $y_i$, $y_{i+1}$, a value $z_i$ is computed from the formula:

$$z_i + y_i + y_{i+1} - 2y_{i-1}.$$

The value of the product XY, where X is the multiplicand quantity, may, in accordance with the modified algorithm, be written in the form:

$$XY = \sum_{i=1\ \text{odd}}^{n-1} X z_i 2^{-i}$$

and this may be expanded to yield an iterative expression for a partial product $PP_i$:

$$PP_i - z_i X + (\tfrac{1}{4}) PP_{i+2},$$

for $i = n-1, n-3, \ldots 5, 3, 1$.

As a final step in the process, XY is found from:

$$XY = (\tfrac{1}{4})PP_1$$

The process of multiplication is in this manner reduced to a sequence of simple iterative steps, each involving a shift to divide by four and an add, to add a multiple of the multiplicand X. It can be seen that $z_i$ may assume any of five values: $-2$, $-1$, $0$, $+1$ or $+2$. Since the $W^k$ values stored in the read-only memory 10 are known in advance and do not vary, a significant amount of time can be saved if the Booth's code values $Z_i$ are stored, rather than the binary codes $y_i$. For a 16-bit multiplier quantity Y, it is necessary to store $z_{15}$, $z_{13}$, . . . $z_1$, i.e., eight values, each of three bits. Thus, the penalty for the faster multiplication time obtained from storing the multiplier quantities in Booth's code is that each 16-bit multiplier quantity occupies twenty-four bits of storage. The read-only memory 10 is $48 \times 24$ bits in capacity, to accommodate the real and imaginary components of the sixteen twiddle factors $W^0$–$W^{15}$ needed for computation the 32-point FFT, plus sixteen additional imaginary components required to perform inverse FFT's.

The instruction codes input over lines 108 to the instruction decoder 42 have the following specific meanings:

Code 0000: Load data into random access memory and perform 32-point FFT.

Code 0001: Unload FFT coefficients from random access memory in bit-reversed sequence.

Code 0010: Unload FFT coefficients from random access memory in natural-order sequence.

Code 0011: Unload FFT coefficients, write new data into random access memory in the following half cycle, and perform 32-point FFT.

Code 01XX: Right-shift all words before writing into memory during next computation pass.

Code 10XX: Provide status to return codes status register.

Code 11XX: Clear status return instruction 10XX.

Before turning to a more detailed explanation of the instruction codes, the status codes that can be provided in the status register 40 will be briefly reviewed. The status register 40 has five bits. Bits 0–2 comprise a three-bit counter for recording the pass number of the FFT computation. The counter is zeroed during the data loading operation, and makes a first count of the end of the load when the FFT computation starts. Bit 3 is an overflow flag. If an overflow is generated at any time in the FFT computation and is not corrected by a right-shift, bit 3 is set to a one and is not cleared until a subsequent loading operation. Bit 4 is a "busy" flag, which is set to a one by a loading operation and is not cleared until the FFT computation is complete. It is not affected by unloading operations.

It can be seen that the basic instruction 0000 is effective to load real and imaginary components of input data into the random access memory 16 and to initiate computation of the 32-point FFT. In addition, a "busy" code is latched into the status register 40 at the beginning of execution of the instruction. Instructions 0001 and 0010 are the unloading instructions, which would typically be performed upon detection that the FFT computation was complete. Instruction 0001 generates a scan of the random access memory addresses in bit reversed sequence. If the data inputs were provided in natural order, this output or unload command would result in providing the coefficients in bit-reversed sequence. Instruction 0010 generates a scan of the RAM addresses in normal numerical sequence and results in the output of FFT coefficients in order of increasing frequency.

Instruction 0011 may be used to interleave reading and writing operations to give a faster overall throughput of the circuit. The instruction causes unloading and loading to be effected simultaneously, and then for the 32-point FFT to begin computation as soon as the loading and unloading operations are complete. Instruction 01XX is the right-shift instruction. It is not immediately executed if the FFT is in the middle of a pass. Rather, execution is delayed until the start of the next pass, at which time all data words are right-shifted by one bit before being written back into memory for that pass. The overflow bit in the status word can be monitored and the right-shift instruction issued accordingly to insure that overflow does not affect the integrity of the results.

Figure 3:
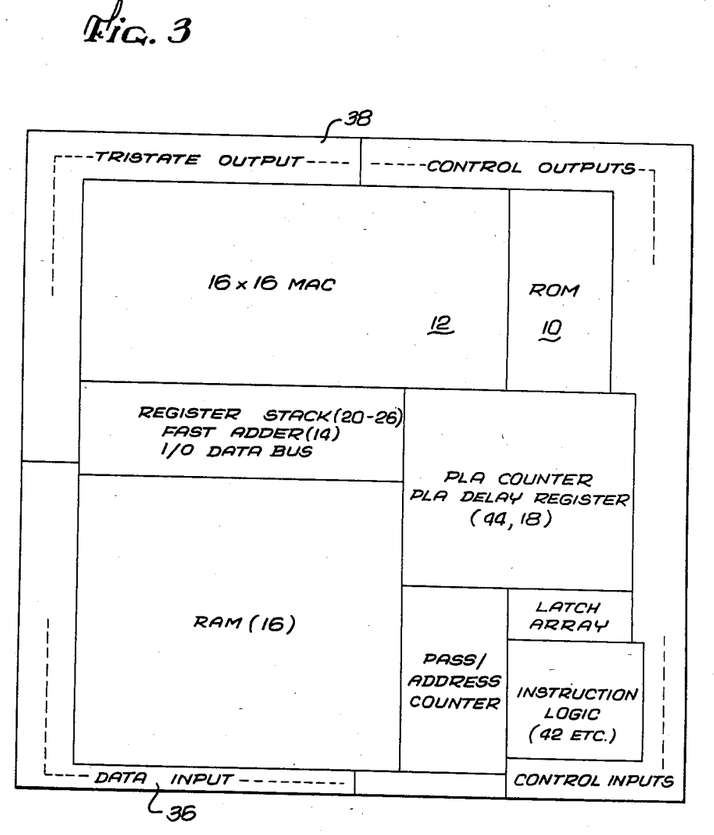
FIG. 3 is a plan view showing the chip "floorplan" of the circuit.

FIG. 3 shows the chip "floor plan" of the FFT circuit. It will be appreciated that the read-only memory 10, multiplier-accumulator circuit 12, precoded logic array 18, random access memory 16 and adder circuit 14, together with the registers 20, 22, 24 and 26 are arranged to minimize the length of signal and data paths through the chip. The chip is manufactured utilizing a CMOS process with minimum feature geometries in the region of two microns, but could be fabricated in bipolar or NMOS form. Furthermore, the invention is not limited to any particular fabrication process or to any particular circuit logic family. The chip size of the illustrative embodiment is approximately $236 \times 248$ mils and it contains approximately 27,000 FET devices. The power supply is 5.0 volts and the chip is packaged as a 64-pin configuration providing transistor-transistor logic (TTL) compatible logic levels for input and output. Execution of the FFT computation takes approximately 34.5 microseconds, with another 11.8 microseconds being needed to load and unload the random access memory. Accordingly, the total transform time is approximately 47 microseconds.

Figure 4:
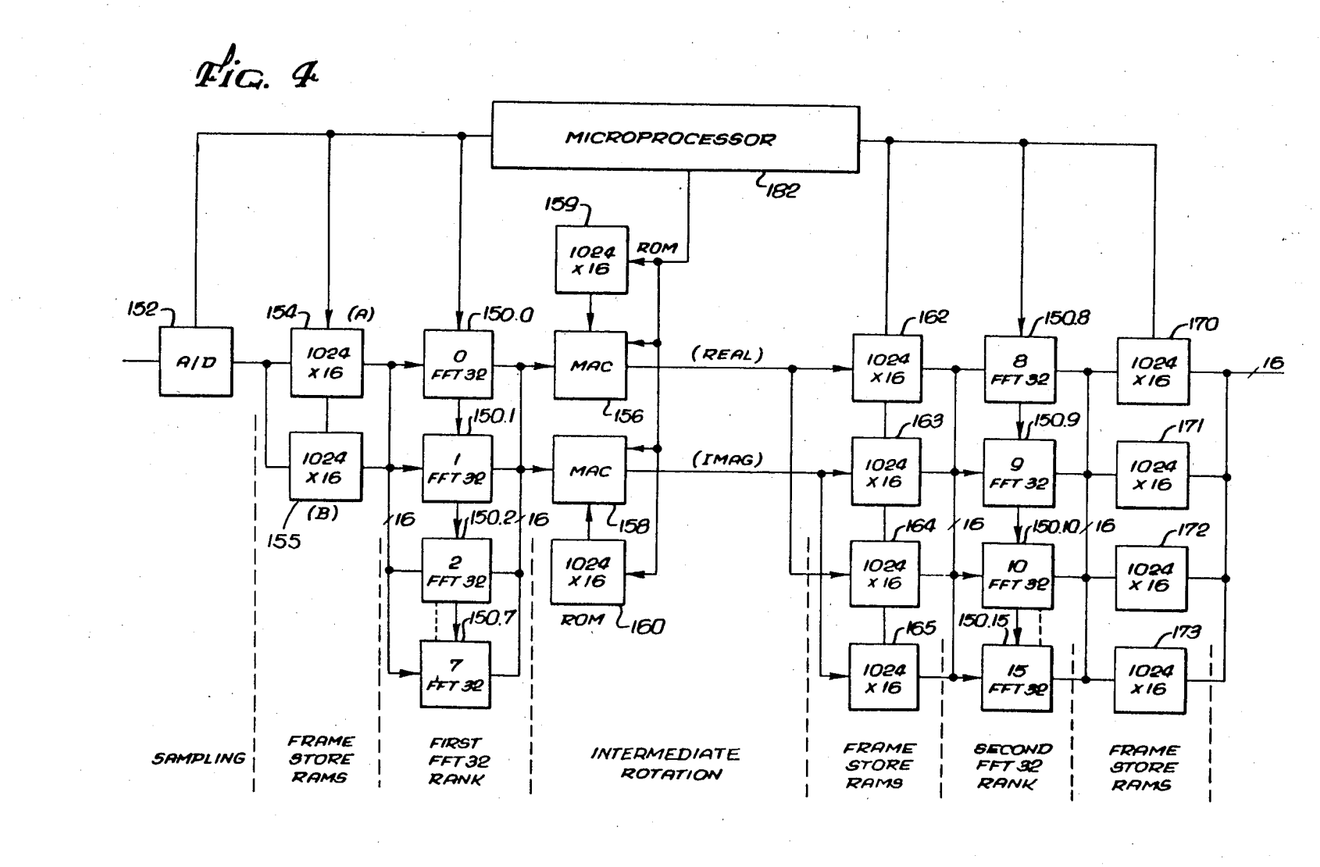
FIG. 4 is a block diagram of a 1024-point FFT employing sixteen 32-point FFT circuits of the type shown in FIG. 1.

It will be appreciated from the description of the 32-point FFT circuit that it may be combined with others of identical type to perform larger FFT computations. All of the external connections to a single 32-point FFT circuit may be conveniently connected to a single busing structure, which includes the input and output data buses, chip selection address buses, and status register buses, as well as power supply and clock buses. In such an expanded configuration, selection of the appropriate circuit for computation is made by means of the chip select lines 116. Shown by way of example in FIG. 4 is a 1024-point FFT employing sixteen 32-point FFT circuits of the type discussed with reference to FIG. 1. It will be seen that the larger FFT configuration includes a first rank of eight FFT circuits, indicated by reference numerals 150.0 through 150.7, and a second rank of eight FFT circuits indicated by reference numerals 150.8 through 150.15. Other functional stages of the configuration are a sampling stage, including the A-to-D converter 152, a frame store random access memory indicated by the two RAMs 154 and 155, and an intermediate rotation stage including two multiplier-accumulators 156 and 158 and two read-only memories 159 and 160. A further frame storage stage is indicated by the random access memories 162–165, and a final set of frame storage RAMs is shown by the RAM modules 170–173. A microprocessor 182 is shown as providing control signals to the A-to-D converter 152, to the FFT circuits 150, as well as to the multiplier-accumulators 156 and 158 and the memories 154, 155, 159, 160, 162–165 and 170–173.

FIG. 4 is an implementation of what is referred to in the Rabiner and Gold text as the "unified approach to the FFT." The dual input memories 154 and 155 provide a fully pipelined or buffered operation. One of these buffers is written into while the other is being read from. The circuit operates on the principle, as described in the Rabiner and Gold text, that a large N-point sequence, which is basically a one-dimensional signal, can be expressed and manipulated as a two-dimensional array. In accordance with this approach, the 1024-point sequence is stored and manipulated as a 32×32 matrix. The FFT function is performed on each column of the matrix, by the first rank of FFT circuits, the resulting coefficients are rotated or twiddled, then the resulting matrix is operated on by FFT circuits in the second rank, on a row-by-row basis, to obtain the desired sequence of coefficients for the 1024-point FFT.

It is assumed in FIG. 4 that the A-to-D converter 152 is providing a sequence of real data values from a sampling system, and that, in the initial phase of FFT operation, zero values will be inserted in place of the imaginary components of the input data. Alternatively, if the input buffers 154 and 155 were doubled in size, imaginary samples supplied by a quadrature input sampler (not shown) could also be handled. While the buffer 155 is being filled, buffer 154 is unloaded column by column into the FFT's of the first rank, i.e., FFT's 150.0–150.7. The timing is arranged such that column 0 is loaded into FFT 150.0, column 1 into FFT 150.1, and so forth, column 7 being loaded into FFT 150.7. By this time, the first FFT 150.0 will have completed its computations. The resulting FFT coefficients may be unloaded and the next column, column 8, loaded into this FFT 150.0.

This process continues until all columns of the input data have been processed through the first rank of FFT's. It will be seen that this will result in each FFT of the first rank handling four separate columns. For example, FFT 150.0 will process columns 0, 8, 16 and 24, and FFT 150.7 will process columns 7, 15, 23 and 31. At this point, if more input data is to be processed the input buffers 154 and 155 will switch roles, and the A-to-D converter 152 will begin to reload buffer 154 while buffer 155 is being processed in a similar manner to that described for buffer 154.

Each column of data processed by the first rank of FFT's will result in 32 FFT coefficients, which will have real and imaginary components. These coefficients will be processed by the intermediate rotation section including the multiplier-accumulators 156 and 158 and read-only memories 159 and 160. These ROM's 159 and 160 contain twiddle factors to effect appropriate rotation of the intermediate results, which are then stored, still in a columnwise configuration, in the frame store memories 162–165. The storage of this data will occupy 1024×16 bits for the real components and 1024×16 for the imaginary components. It will be seen, therefore, that the frame store random access memories 162–165 represent twice the capacity than is actually needed for the storage of these intermediate results. These buffers 162–165 are used in much the same way as the input storage buffers 154 and 155, there being alternation between pairs of buffers. While one half of the memory is loaded by columns, the other half is being read by rows into the second rank of FFT's.

The intermediate data from the frame store memories 162–165, or rather from two of these modules at a time, is read row by row into the second rank of FFT's 150.8–150.15. As in the first stage of FFT computation, row zero is read into the first FFT 150.8, row one is read into FFT 150.9 and so on until row seven is read into FFT 150.15. At this time, FFT 150.8 will have concluded its computation and may be unloaded, and then loaded with the next row, i.e., row 8. This process continues until all rows of the matrix have been processed through the second rank of FFT's. The output data in the form of FFT coefficients from the second rank of FFT's is loaded row-by-row into the double-buffered memories 170–173. From these frame storage random access memories, data can be read in a columnwise fashion. The resulting data are 16-bit word pairs representing FFT coefficients of increasing frequencies. Assuming one 32-point FFT can transform data in approximately 47 microseconds, the illustrated configuration provides a 1024-point FFT in approximately 188 microseconds, but subject to a latency time of 752 microseconds. In other words, the first FFT computation would be concluded in 940 microseconds, and each subsequent FFT computation would be concluded every 188 microseconds.

It will be appreciated that the same principles embodied in this unified approach to FFT's could be used in other configurations. For example, a 1024-point FFT could be effected instead by means of two ranks of 16 FFT's, each being used twice, or two ranks of 32 FFT's, each being used once, or any other combination giving 32 computations of 32-point FFTs per rank. Such an arrangement can be most conveniently controlled by a microprocessor, such as the one shown at 182, programmed to coordinate the data transfers and computations needed. The function of the microprocessor 182 is basically one of controlling operations by initiating data transfers and initiating FFT computations. Since each of the FFT modules can proceed in an essentially asynchronous manner with respect to the others, the microprocessor need only address the appropriate FFT module by its unique address and give the instruction to start computation. When the microprocessor determines that it is ready to load new data into an FFT module, it need only check the status associated with that module to insure that the computation is complete, and then begin loading a new set of data for processing. Since the FFT modules are essentially asynchronous in nature, and are conveniently configured for connection to a common bus system, they lend themselves extremely well to convenient control by a single microprocessor or other control element.

The invention has been described in detail, and any additional information needed to practice the invention is believed to be largely a matter of routine engineering design. For the sake of completeness, however, the material appended to the specification as Appendix A provides complete logic diagrams of the 32-point FFT circuit of the invention.

It will be appreciated from the foregoing that the present invention represents a significant advance in the field of FFT hardware. In particular, the provision of memory, computation and control circuitry on a single monolithic chip provides an FFT circuit with heretofore unavailable advantages of high speed, relatively low power, and modularity. Since a chip constructed in accordance with these principles can be uniquely addressed, and can be conveniently controlled and provided with data by a common busing arrangement, the circuit can be easily connected in larger configurations for the processing of larger FFT computations. It will also be appreciated that, although a specific embodiment of the invention has been described in detail for purposes of illustration, various modifications may be made without departing from the spirit and scope of the invention. For example, although a radix-two, 1024-point FFT is illustrated, the principles used are not limited to radix-two FFT's, and may be extended to mixed-radix FFT computations. Accordingly, the invention is not to be limited except as by the appended claims.

We claim:

1. A monolithic circuit for performing a fast Fourier transform (FFT), said circuit comprising:
    a fast multiplier employing a modified version of Booth's algorithm;
    a first adder circuit to combine products from said multiplier circuit;
    a read-only memory for storage of FFT twiddle factors for input to said fast multiplier circuit;
    a two-port random access memory, having a read bus and a write bus, for storage of input data, intermediate results and output data in an in-place FFT operation;
    a data input register connectable to the write bus of said random access memory;
    a data output register connectable to the read bus of said random access memory;
    a second adder circuit to combine outputs from said first adder circuit with input and intermediate data from said random access memory;
    a stack of registers to provide temporary storage for data being transferred between said random access memory and said multiplier circuit and between said random access memory and said second adder circuit; and
    a control and timing circuit for generating signals to control transfer of data and operation of said multiplier circuit, said random access memory, said first and second adder circuits, and said stack of registers, to effect computation of the FFT of a set of input signals applied to said data input register;
    and wherein said control and timing circuit includes
        an address comparator for comparing a chip selection address supplied to said monolithic circuit with a unique chip identifier, and generating an instruction enabling signal when a match is found, and
        an instruction decoder for receiving an instruction code indicative of specific circuit functions to be initiated, and an instruction enabling signal from said address comparator, to confirm that the instruction is intended for this particular circuit.

2. A monolithic circuit as set forth in claim 1, wherein said control and timing circuit further inincludes:
    a sequencing counter, the contents of which are advanced in response to clock signals; and
    a precoded logic array operative in response to signals received from said sequencing counter and said instruction decoder, to generate control signals directed to said multiplier circuit, said first and second adder circuits, said stack of registers and said data input and output registers, and address-selection signals to said read-only memory and said random access memory;
    and wherein the control signals and address-selection signals from said precoded logic array effect computation of the fast Fourier transform of data placed in said random access memory, in accordance with the decimation-in-time method.

3. A monolithic circuit as set forth in claim 2, wherein:
    said instruction decoder is responsive to a first instruction code to load a sequence of input data from said input register to said random access memory and begin FFT computation, and a second instruction code to unload FFT coefficients from said random access memory to said output register.

4. A monolithic circuit as set forth in claim 1, wherein:
    said input register and said output register are connectable to data bus lines;
    chip selection address signals applied to said address comparator are supplied over a chip addressing bus; and
    said monolithic circuit can be conveniently connected to a common bus structure and other monolithic FFT circuits, to facilitate computation of a larger FFT than could be computed in a single monolithic FFT circuit.

5. A monolithic circuit as set forth in claim 1, wherein said fast multiplier circuit and said first adder circuit are combined for greater speed into a single multiplier-accumulator circuit.

6. A monolithic circuit as set forth in claim 5, wherein said stack of registers includes:
    a first register to hold the real component of a multiplicand;
    a second register to hold the imaginary component of a multiplicand;
    a third register to hold a quantity to be added to a product sum from said multiplier-accumulator circuit; and
    a fourth register to hold a result quantity from said second adder circuit.

7. A monolithic circuit as set forth in claim 1, wherein:
    the twiddle factors are stored in said read-only memory in a Booth-coded form compatible with the modified version of Booth's multiplication algorithm; and
    said multiplier circuit is configured to accept multiplier quantities in the Booth-coded form.

8. A monolithic circuit for performing a fast Fourier transform (FFT) by the decimation-in-time method, said circuit comprising;
    a read-only memory for storage of FFT twiddle factors;
    a fast multiplier circuit employing a modified version of Booth's algorithm;
    a first fast adder circuit to combine products from said multiplier circuit;
    a second fast adder circuit for performing butterfly computations in conjunction with said multiplier circuit and said first fast adder circuit;
    a random access memory having a read bus and a write bus, for initial storage of a sequence of input complex quantities derived from samples of a time-varying signal, and for storage of intermediate and final results in an in-place FFT operation;
    a register stack to act as a buffer for the transmission of data between said random access memory and said multiplier and adder circuits;

a twiddle factor register to act as a buffer between said read-only memory and said multiplier circuit;

an input register coupled to the write bus of said random access memory for input of samples of data;

an output register coupled to the read bus of said random access memory for output of FFT coefficients;

a read-only memory address decoder;

a read address decoder for the random access memory;

a write address decoder for the random access memory; and a control and timing circuit for generating signals to control transfer of data to and from said multiplier and adder circuits, and to control operation of said multiplier and adder circuits, to effect computation of the FFT by repeated use of said multiplier and adder circuits to perform butterfly computations;

and wherein said read-only memory address decoder, and said read address decoder and write address decoder each generate memory selection signals in response to address signals transmitted by said control and timing circuits;

and wherein said control and timing circuit includes an address comparator for comparing a chip selection address supplied to said monolithic circuit with a unique chip identifier, and generating an instruction enabling signal when a match is found, and an instruction decoder for receiving an instruction code indicative of specific circuit functions to be initiated, and an instruction enabling signal from said address comparator, to confirm that the instruction is intended for this particular circuit.

9. A monolithic circuit as set forth in claim 8, wherein said control and timing circuit further includes:

a sequencing counter, the contents of which are advanced in response to clock signals; and a precoded logic array operative in response to signals received from said sequencing counter and said instruction decoder, to generate control signals directed to said multiplier circuit, said first and second adder circuits, said stack of registers and said data input and output registers, and address-selection signals to said read-only memory and said random access memory;

and wherein the control signals and address-selection signals from said precoded logic array effect computation of the fast Fourier transform of data placed in said random access memory, in accordance with the decimation-in-time method.

10. A monolithic circuit as set forth in claim 9, wherein:

said instruction decoder is responsive to a first instruction code to load a sequence of input data from said input register to said random access memory and begin FFT computation, and a second instruction code to unload FFT coefficients from said random access memory to said output register.

11. A monolithic circuit as set forth in claim 8, wherein:

said input register and said output register are connectable to data bus lines;

chip selection address signals applied to said address comparator are supplied over a chip addressing bus; and said monolithic circuit can be conveniently connected to a common bus structure and other monolithic FFT circuits, to facilitate computation of a larger FFT than could be computed in a single monolithic FFT circuit.

12. A monolithic circuit as set forth in claim 8, wherein said fast multiplier circuit and said first fast adder circuit are combined for greater speed into a single multiplier-accumulator circuit.

13. A monolithic circuit as set forth in claim 12, wherein said register stack includes:

a first register to hold the real component of a multiplicand;

a second register to hold the imaginary component of a multiplicand;

a third register to hold a quantity to be added to a product sum from said multiplier-accumulator circuit; and a fourth register to hold a result quantity from said second adder circuit.

14. A monolithic circuit as set forth in claim 13, wherein:

said first and second registers are connected to receive data over the read bus of said random access memory and to transmit multiplicand data to said multiplier-accumulator circuit;

said third register is connected to receive data over the read bus of said random access memory and to transmit data to said second adder circuit;

said fourth register is connected to receive sum data from said second adder circuit and to transmit data to the write bus of said random access memory.

15. A monolithic circuit for performing a fast Fourier transform (FFT) by the decimation-in-time method, said circuit comprising;

a read-only memory for storage of FFT twiddle factors;

a fast multiplier circuit employing a modified version of Booth's algorithm;

a first fast adder circuit to combine products from said multiplier circuit;

a second fast adder circuit for performing butterfly computations in conjunction with said multiplier circuit and said first fast adder circuit;

a random access memory having a read bus and a write bus, for initial storage of a sequence of input complex quantities derived from samples of a time-varying signal, and for storage of intermediate and final results in an in-place FFT operation;

a register stack to act as a buffer for the transmission of data between said random access memory and said multiplier and adder circuits;

a twiddle factor register to act as a buffer between said read-only memory and said multiplier circuit;

an input register coupled to the write bus of said random access memory for input of samples of data;

an output register coupled to the read bus of said random access memory for output of FFT coefficients;

a read-only memory address decoder;

a read address decoder for the random access memory;

a write address decoder for the random access memory; and a control and timing circuit for generating signals to control transfer of data to and from said multiplier and adder circuits, and to control operation of said multiplier and adder circuits, to effect computation of the FFT by repeated use of said multiplier and adder circuits to perform butterfly computations; and wherein said read-only memory address decoder, and said read address decoder and write address decoder each generate memory selection signals in response to address signals transmitted by said control and timing circuits, the twiddle factors are stored in said read-only memory in a Booth-coded form compatible with the modified version of Booth's multiplication algorithm, and said multiplier circuit is configured to accept multiplier quantities in the Booth-coded form.

16. A monolithic circuit as set forth in claim 15, wherein:

said monolithic circuit functions to compute a 32-point FFT;

said random access memory includes sixty-four words of storage for holding thirty-two complex quantities for in-place computation of the FFT; and said read-only memory includes forty-eight words of storage for holding sixteen complex quantities and their conjugates in Booth's code form, for computation of forward and inverse FFT's.

17. A monolithic circuit for performing a fast Fourier transform (FFT), said circuit comprising:

a fast multiplier employing a modified version of Booth's algorithm;

a first adder circuit to combine products from said multiplier circuit;

a read-only memory for storage of FFT twiddle factors for input to said fast multiplier circuit;

a two-port random access memory, having a read bus and a write bus, for storage of input data, intermediate results and output data in an in-place FFT operation;

a data input register connectable to the write bus of said random access memory;

a data output register connectable to the read bus of said random access memory;

a second adder circuit to combine outputs from said first adder circuit with input and intermediate data from said random access memory;

a stack of registers to provide temporary storage for data being transferred between said random access memory and said multiplier circuit and between said random access memory and said second adder circuit; and a write address decoder for the random access memory; and a control and timing circuit for generating signals to control transfer of data and operation of said multiplier circuit, said random access memory, said first and second adder circuits, and said stack of registers to effect computation of the FFT of a set of input signals applied to said data input register; and wherein the twiddle factors are stored in said read-only memory in a Booth-coded form compatible with the modified version of Booth's multiplication algorithm, and said multiplier circuit is configured to accept multiplier quantities in the Booth-coded form.

18. A large-scale N-point FFT circuit structure, comprising:

a first random access storage matrix for holding N complex quantities in an $1 \times m$ array, where $1 \times m = N$;

a first rank of monolithic FFT circuits coupled to receive input data column-by-column from said first random access storage matrix and to provide intermediate FFT coefficients having real and imaginary components;

a pair of multiplier circuits and a pair of twiddle factor read-only memories to effect phase rotation without magnitude change in the intermediate FFT coefficients, wherein one multiplier circuit and one read-only memory together compute the real components of the rotated intermediate FFT coefficients, and the other multiplier circuit and read-only memory together compute the imaginary components of the rotated intermediate FFT coefficients;

a second random access storage matrix for holding the rotated intermediate FFT coefficients;

a second rank of monolithic FFT circuits coupled to receive input data row-by-row from said second random access storage matrix and to provide a final set of FFT coefficients;

control means for selecting FFT operations on appropriate ones of said monolithic circuits for controlling transfer of data through said circuit structure; and wherein all of said monolithic FFT circuits are connected to a common bus structure and include chip addressing circuitry to permit initiation of appropriate FFT computations by said control means.

19. A circuit structure as set forth in claim 18, wherein each of said monolithic FFT circuits comprises:

a read-only memory for storage of FFT twiddle factors in Booth-coded form;

a fast multiplier-accumulator circuit employing a modified Booth's algorithm;

a fast adder circuit for performing butterfly computations in conjunction with said multiplier-accumulator circuit;

a random access memory having a read bus and a write bus, for initial storage of a sequence of input complex quantities derived from samples of a time-varying signal, and for storage of intermediate and final results in an in-place FFT operation;

a register stack to act as a buffer for the transmission of data between said random access memory and said multiplier and adder circuits;

a twiddle factor register to act as a buffer between said read-only memory and said multiplier-accumulator circuit;

an input register coupled to the write bus of said random access memory for input of samples of data;

an output register coupled to the read bus of said random access memory for output of FFT coefficients;

a read-only memory address decoder;

a read address decoder for the random access memory;

a write address decoder for the random access memory; and a control and timing circuit for generating signals to control transfer of data to and from, and operation of said multiplier-accumulator and adder circuits, to effect computation of the FFT by repeated use of said multiplier-accumulator and adder circuits to perform butterfly computations;

and wherein said read-only memory address decoder, and said read address decoder and write address decoder, each generate memory selection signals in response to address signals transmitted by said control and timing circuits.

* * * * *